(12) United States Patent
Darnold et al.

(10) Patent No.: US 9,901,499 B2
(45) Date of Patent: Feb. 27, 2018

(54) CUSHION IMMERSION SENSOR

(71) Applicant: Roho, Inc., Belleville, IL (US)

(72) Inventors: Leane Darnold, Kirkwood, MO (US); Kevin C. Meier, St. Louis, MO (US); Thomas John Chaney, Bridgeton, MO (US); Glenn G. Fournie, Smithton, IL (US); Ross P. Peyton, Belleville, IL (US)

(73) Assignee: ROHO, INC., Belleville, IL (US)

( * ) Notice: Subject to any disclaimer, the term of this patent is extended or adjusted under 35 U.S.C. 154(b) by 85 days.

(21) Appl. No.: 14/435,812

(22) PCT Filed: Nov. 18, 2014

(86) PCT No.: PCT/US2014/066181
§ 371 (c)(1),
(2) Date: Apr. 15, 2015

(87) PCT Pub. No.: WO2015/116304
PCT Pub. Date: Aug. 6, 2015

(65) Prior Publication Data
US 2016/0022521 A1    Jan. 28, 2016

Related U.S. Application Data

(60) Provisional application No. 61/933,021, filed on Jan. 29, 2014.

(51) Int. Cl.
*A47C 27/10*    (2006.01)
*A61G 7/057*    (2006.01)
(Continued)

(52) U.S. Cl.
CPC ............ *A61G 7/05776* (2013.01); *A47C 7/02* (2013.01); *A47C 27/10* (2013.01);
(Continued)

(58) Field of Classification Search
CPC .................................................. A61G 7/05776
See application file for complete search history.

(56) References Cited

U.S. PATENT DOCUMENTS 3,747,952 A    7/1973   Graebe
4,239,415 A    12/1980  Blikken
(Continued)

FOREIGN PATENT DOCUMENTS

DE    2550427        5/1976
DE    4231616 A1     3/1994
(Continued)

OTHER PUBLICATIONS

CA Office Action from corresponding CA Patent Application No. 2,888,553 dated Jul. 6, 2016, pp. 1-4.
(Continued)

*Primary Examiner* — Hezron E Williams
*Assistant Examiner* — Alex Devito
(74) *Attorney, Agent, or Firm* — Polsinelli PC

(57) ABSTRACT

A sensor for attachment to an inflatable air cell cushion designed to detect optimal immersion of the cushion user into the in the inflatable cushion. The immersion depth of a user positioned on the cushion is determined by sensing air pressure in the cushion. The sensor accurately reads changes in pressure as air exits the cushion to allow an algorithm to determine optimal internal cushion pressure for a user.

11 Claims, 8 Drawing Sheets

(51) Int. Cl.
*A47C 7/02* (2006.01)
*G05B 15/02* (2006.01)

(52) U.S. Cl.
CPC ......... *A61G 7/05769* (2013.01); *G05B 15/02* (2013.01); *A61G 2203/34* (2013.01)

(56) References Cited

U.S. PATENT DOCUMENTS

| | | |
|---|---|---|
| 4,275,869 A | 6/1981 | Clements |
| 4,541,136 A | 9/1985 | Graebe |
| 4,675,670 A | 6/1987 | Lalonde et al. |
| 4,766,389 A | 8/1988 | Rhoades et al. |
| 4,833,457 A | 5/1989 | Graebe, Jr. |
| 4,907,845 A | 3/1990 | Wood |
| 4,936,147 A | 6/1990 | EerNisse et al. |
| 5,526,701 A | 6/1996 | Tamori |
| 5,640,728 A | 6/1997 | Graebe |
| 5,853,005 A | 12/1998 | Scanlon |
| D415,567 S | 10/1999 | Bar |
| D415,834 S | 10/1999 | Bar |
| D416,326 S | 11/1999 | Bar |
| 6,025,782 A | 2/2000 | Newham |
| 6,034,526 A | 3/2000 | Montant et al. |
| 6,041,658 A | 3/2000 | Casey |
| 6,051,981 A | 4/2000 | Gershenfeld et al. |
| 6,067,019 A | 5/2000 | Scott |
| 6,075,464 A | 6/2000 | Cloutier et al. |
| 6,154,907 A | 12/2000 | Cinquin |
| 6,165,142 A | 12/2000 | Bar |
| 6,297,738 B1 | 10/2001 | Newham |
| 6,337,602 B2 | 1/2002 | Hilliard et al. |
| 6,367,106 B1 | 4/2002 | Gronsman |
| 6,385,803 B1 | 5/2002 | Viard |
| 6,445,988 B1 | 9/2002 | Breed et al. |
| 6,457,355 B1 | 10/2002 | Philipp |
| 6,466,036 B1 | 10/2002 | Philipp |
| 6,487,738 B1 | 12/2002 | Graebe |
| 6,517,106 B1 | 2/2003 | Stanley et al. |
| 6,623,080 B2 | 9/2003 | Clapper |
| 6,772,639 B2 | 8/2004 | Seals |
| 6,778,090 B2 | 8/2004 | Newham |
| 6,840,100 B1 | 1/2005 | Wotiz |
| 6,885,306 B2 | 4/2005 | Holzman et al. |
| 6,897,661 B2 | 5/2005 | Allen et al. |
| 6,940,291 B1 | 9/2005 | Ozick |
| 7,414,536 B2 | 8/2008 | Call et al. |
| 7,583,199 B2 | 9/2009 | Graebe, Jr. |
| 8,698,509 B2 | 4/2014 | Call et al. |
| 2003/0233136 A1 | 12/2003 | Williams et al. |
| 2004/0012056 A1 | 1/2004 | Nejad et al. |
| 2004/0083550 A1 | 5/2004 | Graebe, Jr. |
| 2004/0113634 A1 | 6/2004 | Stanley et al. |
| 2004/0177449 A1 | 9/2004 | Wong et al. |
| 2005/0016290 A1 | 1/2005 | Shank et al. |
| 2005/0200489 A1 | 9/2005 | Sloop et al. |
| 2006/0064820 A1 | 3/2006 | Call et al. |
| 2006/0244466 A1 | 11/2006 | Call et al. |
| 2011/0302719 A1 | 12/2011 | Schwirian et al. |
| 2011/0302720 A1 | 12/2011 | Yakam et al. |
| 2013/0067661 A1 | 3/2013 | Schwirian et al. |
| 2013/0263378 A1 | 10/2013 | O'Keefe et al. |
| 2013/0264157 A1 | 10/2013 | Shen |

FOREIGN PATENT DOCUMENTS

| | | |
|---|---|---|
| EP | 0379694 A2 | 8/1990 |
| EP | 0676158 A1 | 11/1995 |
| JP | 61082104 | 4/1986 |
| JP | 61201310 | 9/1986 |
| JP | 2004286742 | 10/2004 |
| WO | 9747976 A2 | 12/1997 |
| WO | 9803835 A1 | 1/1998 |
| WO | 0025098 A2 | 5/2000 |
| WO | 0038955 | 7/2000 |
| WO | 02077566 A1 | 10/2002 |
| WO | 03002949 A2 | 9/2003 |

OTHER PUBLICATIONS

Capacitative Sensors Design and Applications by Larry K. Baxter, IEEE Press 1997, Chapter 6, pp. 66-82.

PCT International Search report for International Application No. PCT/US2014/066181 dated Mar. 24, 2015.

PCT Written Opinion of the International Searching Authority International Application No. PCT/US2014/066181 dated Mar. 24, 2015.

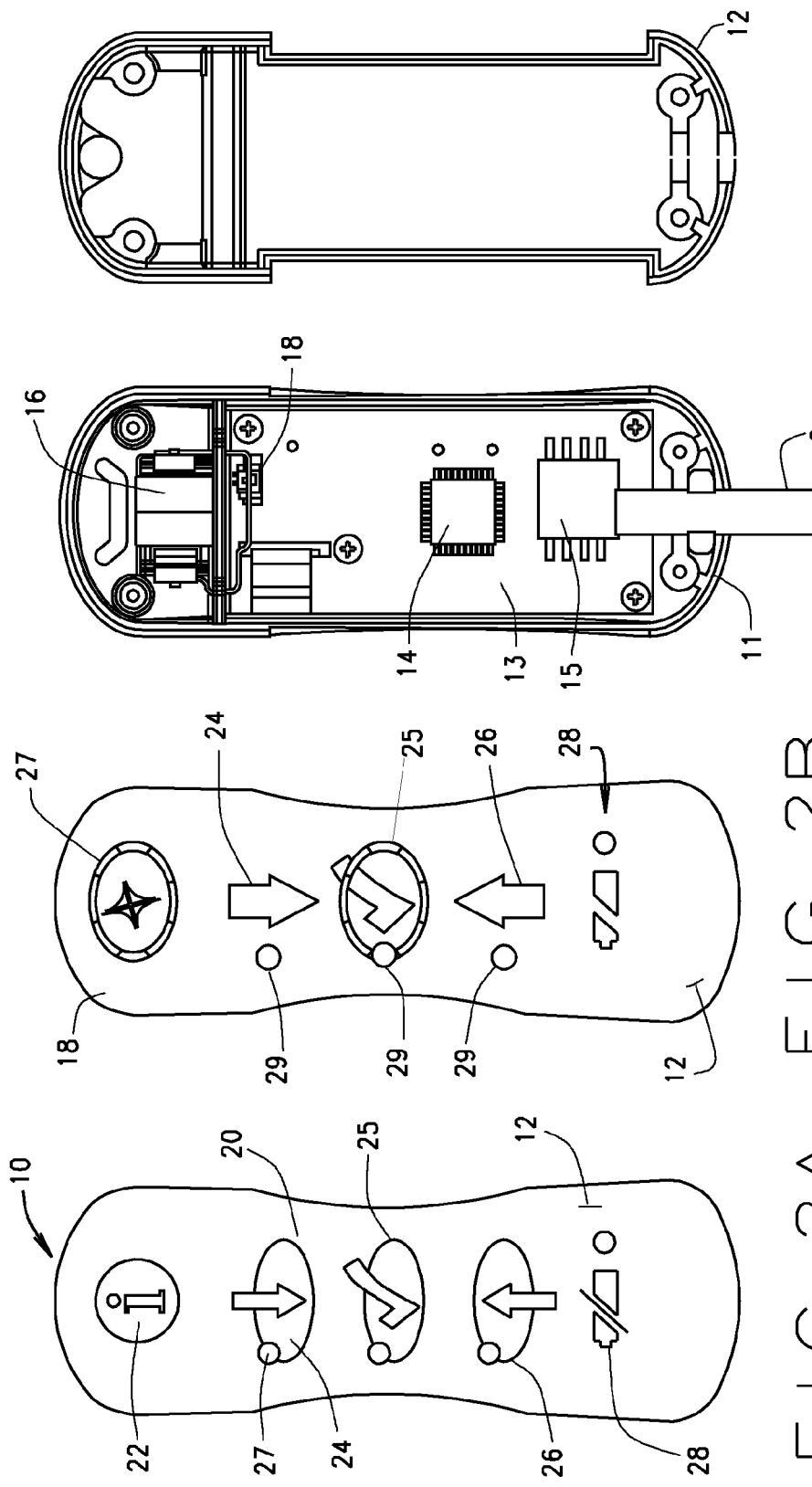

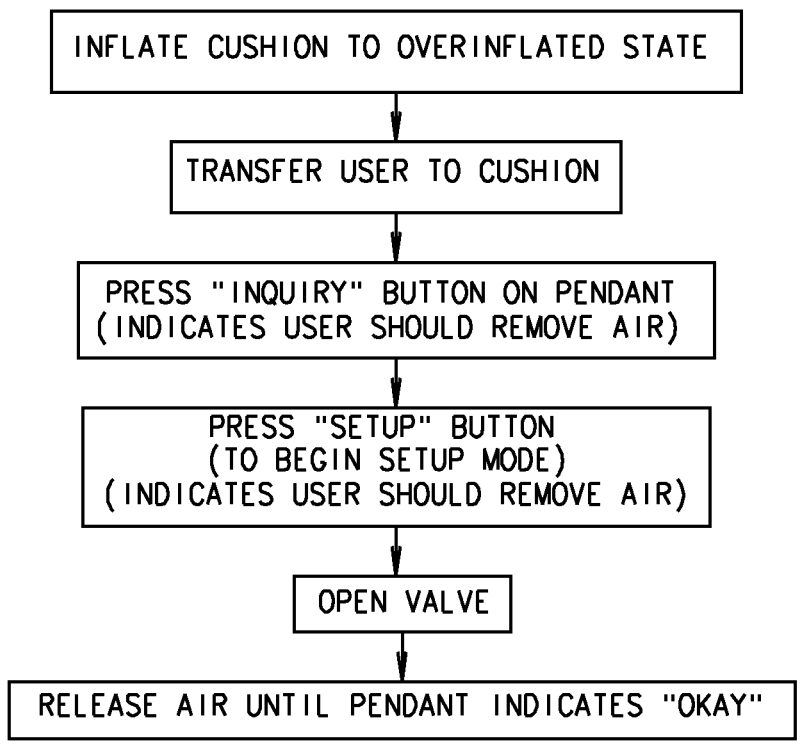
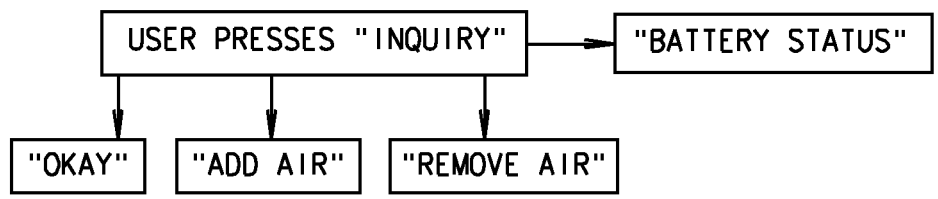
FIG. 4B

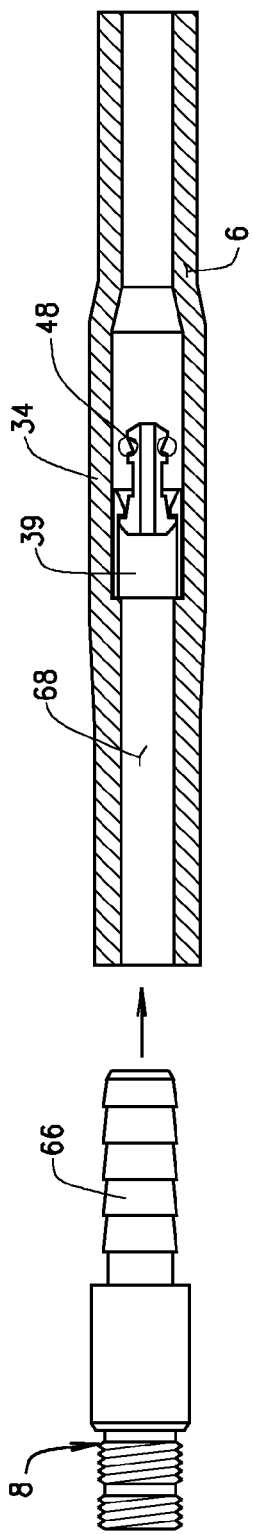
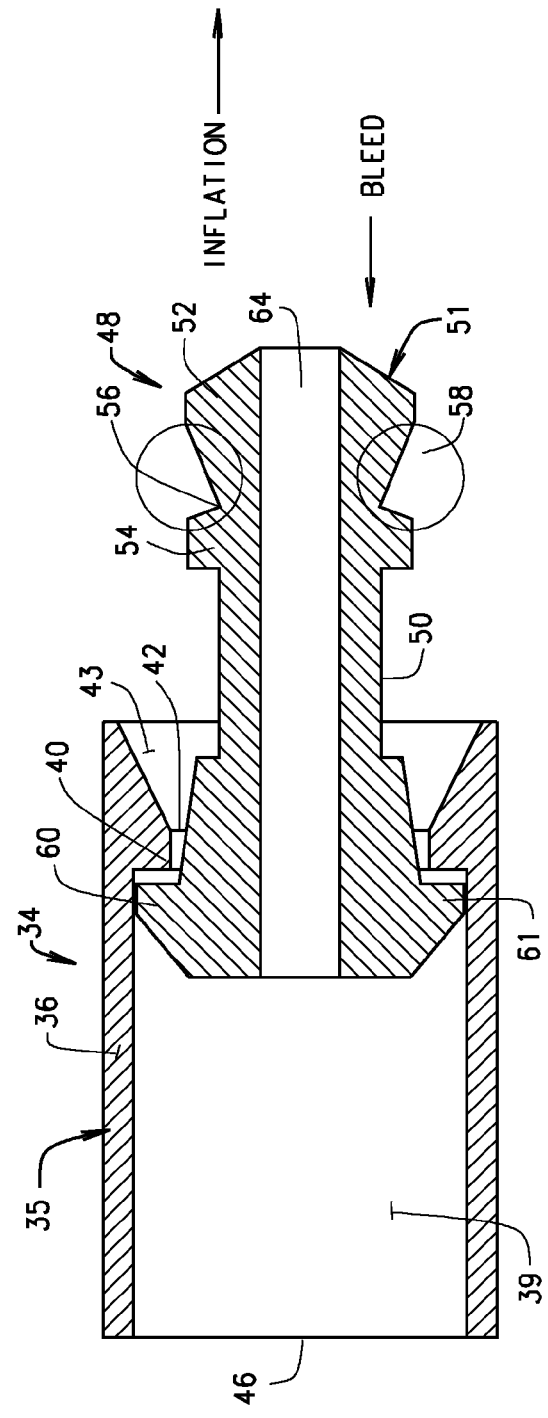

CUSHION IMMERSION SENSOR

RELATED APPLICATIONS

This application is the United States National Stage under 35 U.S.C. § 371 of International Application Ser. No. PCT/US 2014/066181 having an International filing date of Nov. 18, 2014 which claims the benefit of U.S. Provisional Patent Application Ser. No. 61/933,021, filed Jan. 29, 2014, and is related to International Application Ser. No. PCT/US2014/066182, all of which are incorporated herein by reference.

BACKGROUND ART

The disclosure relates generally to seating cushions for the prevention of pressure sores and, more particularly, to a sensor for connection to an inflated air cell cushion that detects immersion of a user into the air cell cushion.

Air cell cushions are known to the art. Generally air cell seat cushions are used by individuals who must remain seated for extended periods of time, for example, a disabled individual who uses a wheelchair for locomotion. Larger air cell cushions, generally configured as mattresses, are used by non-ambulatory or bed ridden individuals. In any event, inflatable air cell cushions are employed to prevent pressure sores on the buttocks or at other bony prominences. These air cell cushions provide support, while distributing weight, generally uniformly through a multiplicity of interconnected air cells.

The typical air cell cushion includes a base and an array of interconnected, upstanding individual air cells, usually arranged in transverse and longitudinal rows. An air inflation tube is in fluid communication with one of the cells. The inflation tube includes a screw type valve. The air cell cushion generally has a stretchy cover. A representative embodiment of such an air cell is disclosed in U.S. Pat. No. 4,541,136, which is incorporated herein by reference.

For proper seating on the cushion, the cushion is placed on a relatively firm or hard support surface, such as a wheel chair seat or other type of seat or chair. The individual or caregiver (either one referred to as "the user") opens the valve and pumps air into the cushion until it is well inflated. The user then sits on the cushion and air is released through the valve until the user is optimally immersed in the air cell cushion. The valve then is closed. Proper immersion optimizes weight distribution and reduces pressure on the anatomy.

Heretofore proper immersion has been determined by a hand check method. That is, the individual or caregiver inserts a hand between the body and cushion to determine when the user is properly immersed in the cushion. Although this method has worked adequately, it is a subjective measurement. Moreover, the depth of immersion can vary depending upon who is checking immersion depth.

It would be advantageous, therefore, to have an apparatus that can objectively detect optimal immersion depth. Such an apparatus should reliably and consistently detect optimal immersion depth for a variety of users regardless of the volume of the cushion, user size or weight.

SUMMARY OF THE INVENTION

One aspect of the disclosure provides for a sensor for attachment to an inflatable air cell cushion designed to detect optimal immersion of the cushion user into the inflatable cushion. The immersion depth of a user positioned on the cushion is determined sensing air pressure in the cushion. The sensor accurately reads changes in pressure as air exits the cushion, which allows an algorithm to determine the optimal internal cushion pressure for the user.

In another aspect, a method of setting optimal immersion of the user is disclosed. By way of example, the method includes providing the air cell cushion; the air cell cushion is overinflated; the individual is positioned on the cushion; air is slowly released from the cushion until the sensor indicates either visually, audibly or both, that the user is optimally immersed in the cushion. The optimal immersion is internally calculated by the senor. Each time the user is repositioned on the cushion, the proper immersion is achieved and the status can be displayed on the sensor e.g. user immersion okay; add air; remove air. The sensor is configured as a pendant, unless there is a significant change in the user's body weight, the volume of air in the cushion or other major factor.

In another aspect, a novel reduced out-flow valve is disclosed. The valve is installed within an air conduit. The reduced out-flow valve allows rapid ingress of air into the cushion to overinflate the cushion, but functions as a baffle to dampen or slow air egress during release of air and immersion of the user.

In one aspect, the reduced out-flow valve effectively limits overshooting optimal immersion depth during release of air from the cushion.

BRIEF DESCRIPTION OF THE DRAWINGS

FIG. 2A is a top plan view of one aspect of the sensor;

FIG. 2B is a top plan view of another aspect of the sensor;

FIG. 3 is a top plan view of a sensor with the top of the casing removed to show internal structures;

FIG. 4B is flow chart showing the steps of another aspect of cushion set up and checking;

FIG. 9 is an exploded side elevational view of the inflation valve and tubing with an internal reduced out-flow valve in cross-section; and FIG. 10 is a side cross-sectional view of the reduced out-flow valve in a flow restricted position.

BEST MODE FOR CARRYING OUT THE INVENTION

The present disclosure is directed to a sensor for attachment to an air cell cushion to determine optimal immersion of a user into the air cell. Although one embodiment of the sensor of the present disclosure is indicated by numeral 1 in drawings, the broader aspects of the disclosure include any type of pressure sensor that can be mounted to an inflatable cushion to detect optimal immersion is considered to be within the scope of the disclosure.

Figure 1:
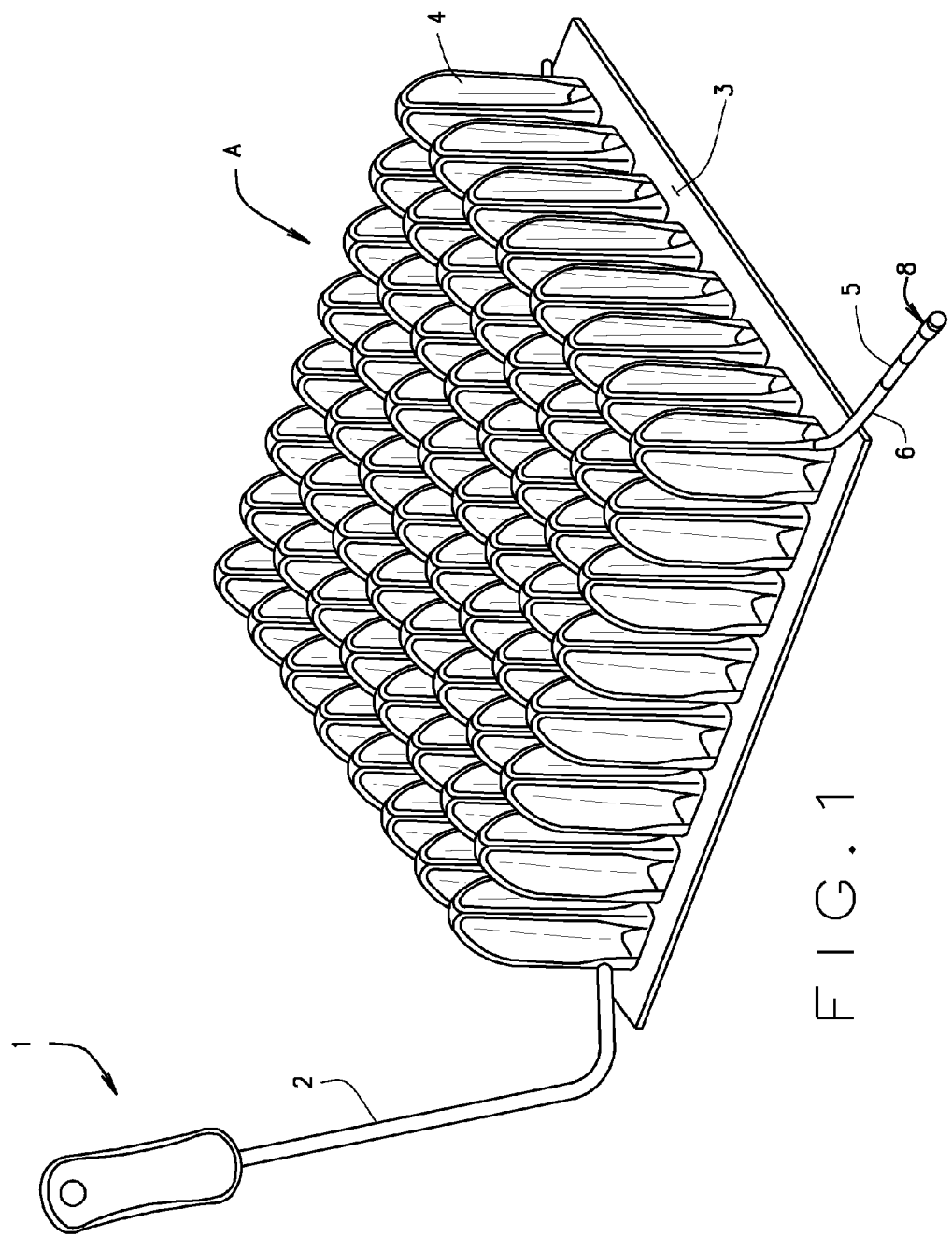
FIG. 1 is a perspective view of an air cell cushion employing the sensor of the present disclosure.

Sensor 1 is shown attached to an air cell cushion A in FIG. 1 by tubular conduit 2, which is in fluid communication with the cells. The sensor may be connected by a quick connect fitting or any appropriate means. Hence, sensor 1 is in fluid communication with the interior of the air cell cushion. In one aspect, sensor 1 is referred to as a pendant because it is connected to the air cell cushion by a relatively long tubular conduit. Air cell cushion A, as shown, is representative of the types of air inflation cushions on which sensor 1 may be employed. The typical air cell cushion A includes a base 3, and an array of interconnected, upstanding individual air cells 4, usually arranged in transverse and longitudinal rows. An air inflation tube 6 is in fluid communication with one of the cells. The inflation tube includes a screw type valve 8.

Air cells 4 are in fluid communication through air channels formed in base 3 so that air introduced into the cushion through inflation tube 6 flows into all the cells until the air pressure is equalized among the cells. A representative embodiment of such an air cell is disclosed in U.S. Pat. No. 4,541,136, which is incorporated herein by reference. The sensor of the present disclosure can be used with any type of inflatable cushion or mattress, whether employing a plurality of individual air cells or fewer air filled compartments or bladders or a single bladder. Moreover it may be used with zoned cushions wherein the air cells are divided into two or more zones of interconnected cells.

Aspects of sensor 1, shown in greater detail in FIGS. 2A through 3, include a housing 10, generally of a clamshell configuration comprising a bottom section 11 and top section 12. It will be noted that housing 10, in the illustrated aspect, has an elongated and relatively narrow ergometric or ergonomic configuration that is easily grasped by a user. However, any configuration or design that is easily grasped or used by a user, for example a disabled user, may be employed.

The internal components of sensor 1 include a circuit board 13, a microprocessor 14, a pressure transducer 15, and one or more batteries 16 to power the sensor. In one aspect, a plurality of disk-shaped or coin batteries 16 are employed. A power connection 18 connects the batteries to the circuit board. As shown, conduit 2 is in fluid communication with pressure transducer 15.

Referring again to FIG. 2A, face 20 of top section 12 includes an inquiry button 22. As shown, inquiry button includes graphic indicia or an icon that denotes the function. In this aspect, inquiry button 22 is a circle containing an "i". Face 20 also includes additional graphic indicia or icons. In the illustrated aspect, the indicia can include a remove air icon 24 (down arrow or other representation of remove air action), a check mark 25 (indicating status ok) and an add air icon 26 (an up arrow or other representation of add air action). The face also can include a battery status indicator 28. It will be understood that the buttons and graphical indicia may have LEDs, indicated by circles 27 next to the graphics, which illuminate to indicate status. The icons and buttons also may be backlit, for example by LED lights, to be highly visible, even in the dark. The graphical indicia or icons shown are intended to be representative only. For example, any indicia, icons or words, lights, or indicators that readily denote the intended function of the underlying buttons or information to be imparted, as will be described below, may be employed with sensor 1.

Referring to FIG. 2B, face 20 of top section 12 includes a check button 25. As shown, check button includes graphic indicia or an icon that denotes the function. In this aspect, check button 25 is shaped to denote a check mark. Face 20 also includes a separate set-up button 27. In this aspect, the set-up button 27 is a symbol denoting a company logo. Also included are additional graphic indicia or icons. In the illustrated aspect, the indicia can include a remove air icon 24 shown as a button configured as a down arrow or other representation of remove air action, a check status icon or button 25, indicating status ok and an add air icon 26 shown configured as an up arrow or other representation of add air action. The face also can include a battery status indicator 28. It will be understood that the graphical indicia have LEDs illustrated as circles 29 next to graphics, which illuminate to indicate status or the buttons or icons may be backlit.

It will be understood that although the various function buttons are referred to as buttons for simplicity and clarity, the buttons or other structures that can actuate functions of sensor 1 are also referred to as actuators. By depressing or otherwise actuating an actuator the sensor performs a desired function.

In general however, the indicia are designed to give a visual indication of the status of user immersion in cushion A, both during set-up of the cushion, and in use after set-up. Set-up of the cushion using the sensor illustrated in FIG. 2A is indicated generally by the steps in flow-chart FIG. 4A:

The user or care giver first overinflates cushion A.

The user is seated on the cushion A.

Next, the user or caregiver pushes an inquiry button 22. As set out above, in the illustrated embodiment the inquiry button is represented by circle "i" 22. However, the inquiry button could be a question mark (?) or the word INQUIRY or the like.

Because cushion A is overinflated, sensor 1 should indicate the action needed, which is remove air. In the illustrated embodiment, remove air (down arrow) icon 24 will be illuminated to indicate the user should bleed air from the cushion through valve 8, for example. The release of air through valve 8 may be controlled by a novel reduced out-flow valve 5, which will be described in detail below.

Once the user is properly immersed in cushion A, sensor 1 will indicate same. In the illustrated embodiment this indication occurs when the LED by the check mark 25 is illuminated.

The user closes valve 8 and proper immersion for the user is set.

Another set-up method with a two button approach using sensor 1 shown in FIG. 2B is indicated generally by the steps in flow-chart FIG. 4B:

The user or caregiver first overinflates cushion A.

The user is seated on the cushion A.

Next, the user or caregiver pushes check button 25. As set out above, in the illustrated embodiment the check button is represented by check mark.

Because cushion A is overinflated, sensor 1 should indicate the action needed, which is remove air. The user then presses the set-up button 27, which starts the set-up mode.

In the illustrated embodiment, remove air (down arrow) icon 24 will be illuminated to indicate the user should bleed air from the cushion through valve 8, for example. The release of air through valve 8 may be controlled by a novel reduced out-flow valve, which will be described in detail below.

Once the user is properly immersed in cushion A, sensor 1 will indicate same. In the illustrated embodiment this indication occurs when the LED by the check mark 25 is illuminated.

The user closes valve 8 and proper immersion for the user is set.

In the unlikely event the user releases too much air and overshoots proper immersion, sensor 1 will indicate more air needs to be pumped into the cushion through valve 8. The steps of FIG. 4A or 4B are repeated until the sensor indicates proper immersion.

Figure 4A:
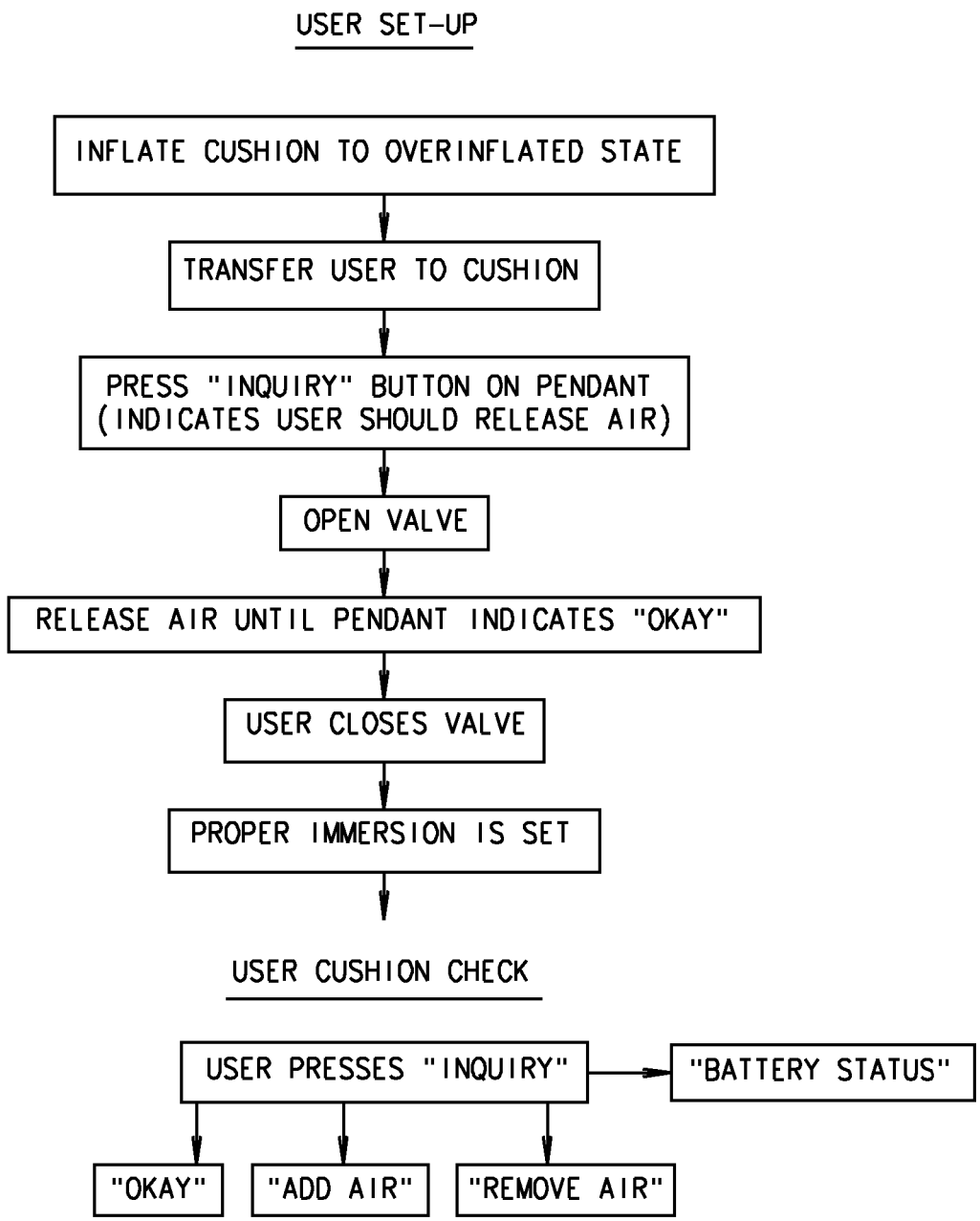
FIG. 4A is flow chart showing the steps of one aspect of cushion set up and checking.

Also as seen in FIG. 2A and FIG. 4A, once the user is properly immersed in cushion A, he may check the status by actuating inquiry button 22. If the user is still set up properly the LED adjacent to the check mark 25 will illuminate. If the cushion is under inflated, and air needs to be added, the LED adjacent to the up arrow 26 will so illuminate. If the cushion is overinflated, and air needs to be removed, the LED adjacent to the down arrow 24 will so illuminate.

Actuation of button 22 also will illuminate LED adjacent to low battery icon 28 if the battery is depleted enough to warrant replacement.

Also as seen in FIG. 2B and FIG. 4B (two button set-up operation), once the user is properly immersed in cushion A, he may check the status by actuating check button 25. If the user is still set up properly the LED adjacent to the check mark 25 will illuminate. If the cushion is under inflated, and air needs to be added, the LED adjacent to the up arrow icon 26 will illuminate. If the cushion is overinflated, and air needs to be removed, the LED adjacent to the down arrow icon 24 will illuminate.

Figure 5:
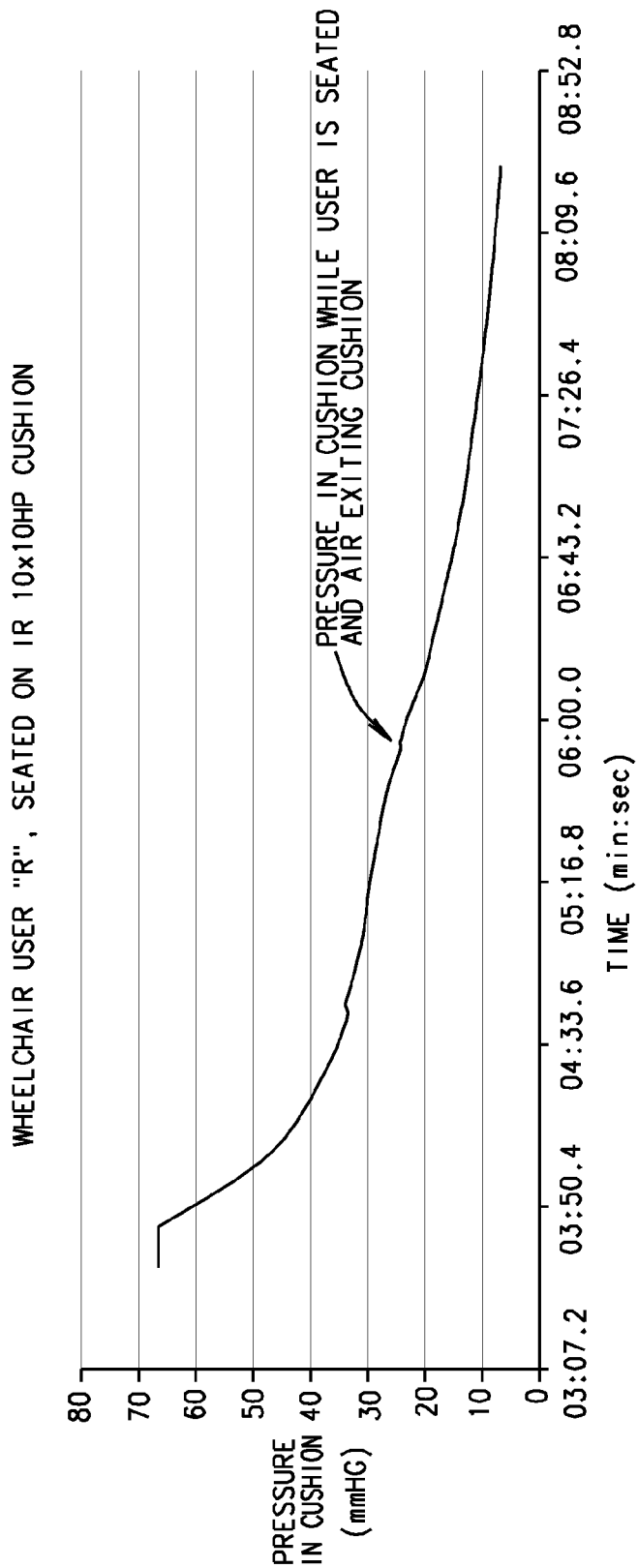
FIG. 5 is a graph illustrating the determination of optimal immersion pressure of a seated user.

Actuation of button 27 also will illuminate LED adjacent to low battery indicator 28 if the battery is depleted enough to warrant replacement. Sensor 1 determines optimum immersion based upon determined internal cushion pressure for a particular user as follows:

Pressure decreases as the air is removed from the cushion during the set up. The pressure decrease is determined by pressure transducer 15. Microprocessor 14 on circuit board 13 is appropriately programmed to take regular pressure readings from pressure transducer 15, for example every one (1) second. Frequency of readings can vary, but about every second works well. The microprocessor averages pressure over N period of time, for example in one aspect pressure is averaged over a period of about six (6) seconds to about ten (10) seconds. The program determines continuous average pressure readings and calculates the difference in a current average pressure reading minus the average pressure over the preceding N period of time. When this difference is under a predetermined value, then the slope of the pressure curve signifies that the optimum pressure representing ideal or optimal immersion for the particularly user has been reached. In a representative example of a pressure curve for user R is illustrated in FIG. 5. The area of optimal immersion is indicated within circle 30 in FIG. 6.

The absolute value will differ depending on the volume of air in a particular cushion, the surface area of the user contacting the cushion and the weight of the user. As can be appreciated from FIG. 5, optimal area 30 is not a finite point, but can represent a discrete continuum along the curve. This is advantageous in that during bleeding of air during set-up, there is less likelihood the user will overshoot the optimal pressure and optimal immersion.

In any event, when the optimal immersion is reached, sensor 1 will so indicate, for example, a check mark 25. The user shuts valve 8. There is adequate time in the microprocessor calculation to allow user to close valve 8 and still remain at optimal immersion. For example, the user has approximately 10 to 15 seconds to close valve 8. If the user waits too long and too much air has been released the Add Air (up arrow) icon 26 will illuminate when the user checks status.

As the user makes subsequent checks of immersion status, microprocessor 14 determines a "range" of acceptable high/low values around optimal immersion pressure. As long as the pressure in the cushion is within this established range for this user, the check mark 25 LED will illuminate.

Sensor 1 may include fail safes; for example, during set-up, microprocessor 14 checks the ideal immersion pressure value. If a user is not seated on cushion A during set-up, when the valve is opened, the pressure value that the microprocessor would select as the optimal immersion will be extremely low, so the check mark indicia 25 will not come on. There will not be a saved setting for this condition. Hence, a person must be positioned on cushion A to establish a value for that person.

Figure 6:
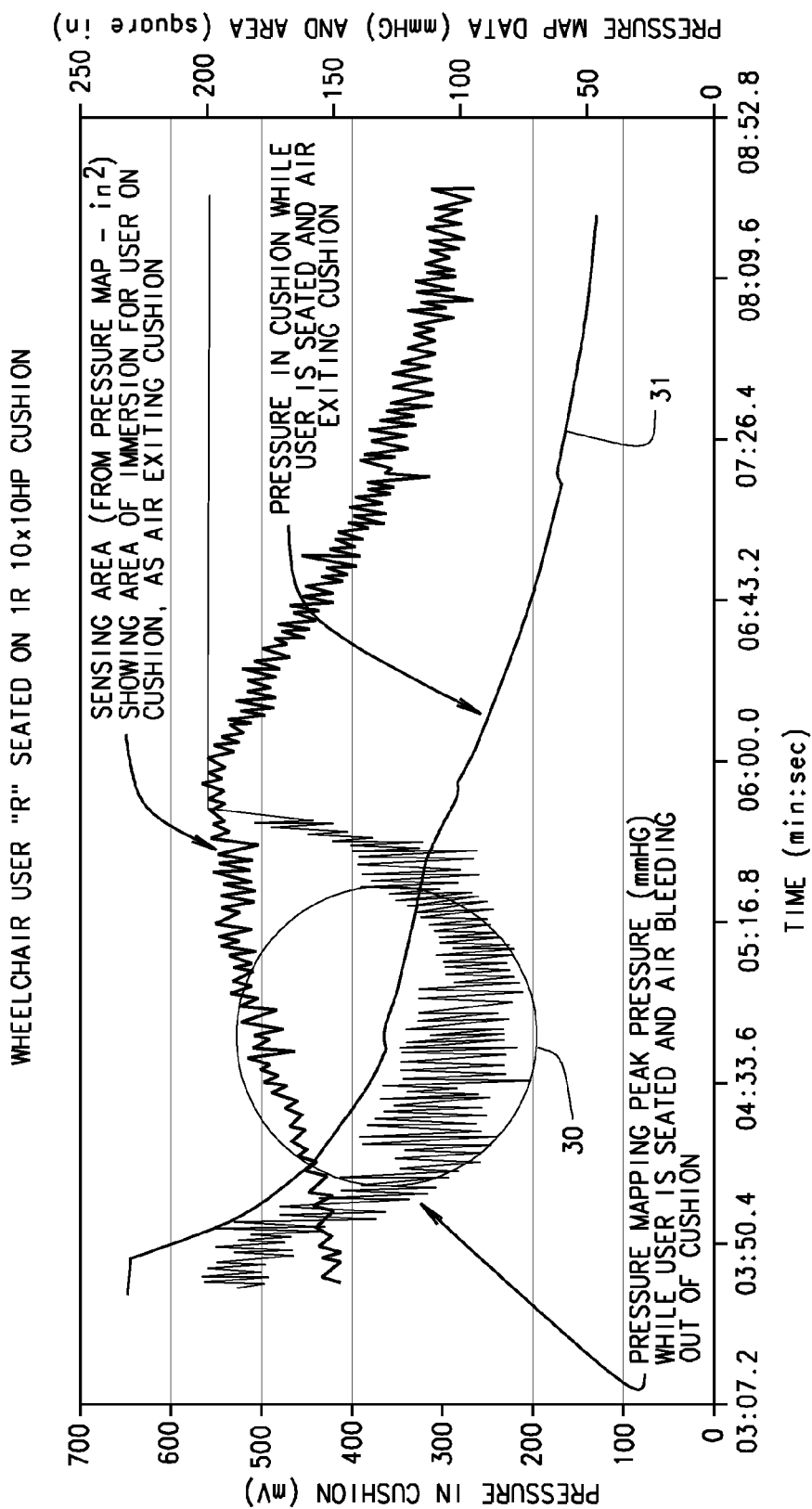
FIG. 6 is a graph illustrating the relationship between pressure mapping and optimal immersion pressure of the seated user.
Figure 7:
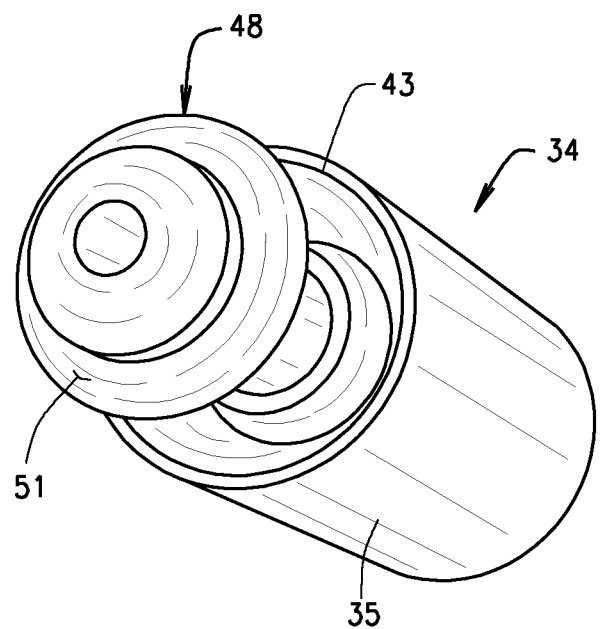
FIG. 7 is a proximal end perspective view of one aspect of a reduced outflow valve.
Figure 8:
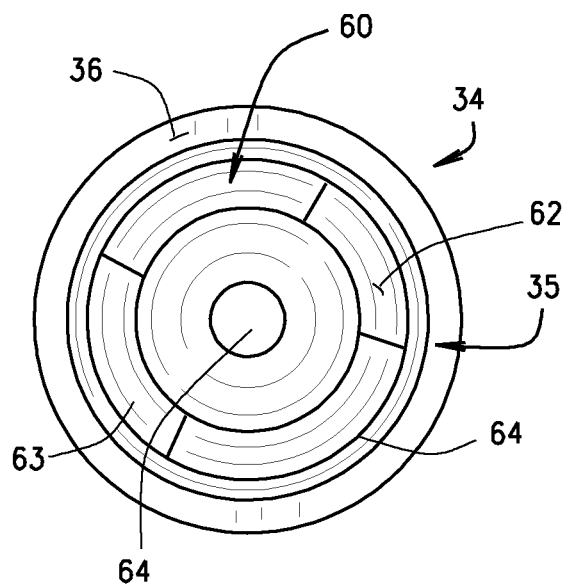
FIG. 8 is a proximal end perspective view of the reduced out-flow valve of FIG. 7.

FIG. 6 illustrates the validity of the sensor results determined by appropriately programmed microprocessor 14. This data represents pressure readings taken every second as air is released from the cushion, along with pressure mapping data pressures. Graphed Internal cushion pressure 31, decreases rapidly as air is first released from the cushion with user sitting on it. The ideal immersion of the user is in the area indicated by 30. The graphed line 31 illustrates the pressure mapping peak values for this user in relation to the internal cushion pressure. As can be seen, the graphed pressure map peak value 31 increases rapidly outside the ideal immersion of the user area indicated 30 in FIG. 6. The sensing area (which is user contact area with the cushion obtained by pressure mapping) changes as the user is immersed into the cushion. Outside the optimal immersion range 30, the sensing area will drop off sharply when the user is not properly supported by the inflated cushion.

As will be appreciated by one skilled in the art, the disclosed sensor will indicate optimal immersion based upon internal cushion pressure for any type or size of cushion and for users of various sizes and shapes. Once the optimal immersion pressure is determined, it is set in sensor 1. It only needs to be reset if there are significant changes in the user's size or weight or physiological condition.

Furthermore, sensor 1 may include audible alarms (not seen) usually mounted inside the top of the case. The audible alarm emits an audible warning signal if there is a change of user immersion depth and internal pressure. Different audible alarms may be provided to indicate different functions or readings, for example under inflation, over inflation, optimal immersion or low battery.

It will be appreciated from the foregoing discussion that sensor 1 is used to determine a specific or quantifiable internal pressure within the cushion that reflects optimal immersion of a specific user of the cushion. This is significant because the quantifiable internal pressure for proper immersion of different users may vary, depending upon the cushion volume, user's body weight, body morphology and the internal volume of the cushion.

As mentioned above, operation of sensor 1 can benefit from the use of a novel reduced out-flow valve to control release of air through valve 8 and make it easier to hit optimal internal pressure for optimal immersion as shown on the graphs by circle 30 without overshooting. As seen in FIGS. 7 through 10, reduced out-flow valve 34 has a valve body 35 comprising cylindrical wall 36 which has a substantially uniform thickness along its longitudinal dimension. Wall 36 is sized and dimensioned to fit within inflation tube 6 with a snug friction fit. Cylindrical wall 36 defines a longitudinal inner bore 39. There is an internal circumferential shoulder 40 at a first end of the body. Shoulder 40 defines a circular opening 42 which is in communication with bore 39. There is a tapered counter bore 43 in the first end of the body in communication with opening 42. The opposite or second end of body 35 defines a circular opening 46. As shown, opening 42 is smaller in diameter than opening 46.

There is a plunger 48 slidingly engaged within bore 39 such that it can slide or moved back and forth longitudinally within bore 39. Plunger 48 has an elongated body 50, a flange 51 with a first circumferential shoulder 52 at the first end and a second spaced apart circumferential shoulder 54 adjacent the first shoulder. The juncture of these two circumferential shoulders defines seat 56 for an O-ring seal 58. O-ring 58 is dimensioned to fit within counter bore 43 when plunger 48 slides toward the second end of body 35 within bore 39. There is a pair of opposed arcuate shoulders 60, 61 at the extreme distal end of the plunger. Shoulder 60 and 61 define air flow spaces 62, 63 between them. The radial expanse of shoulders 60 and 61 is greater than the diameter of circumferential shoulder 40 inside wall 36. Plunger 48 defines an inner bore 64 that extends the entire length of the plunger. Bore 64 is a substantially uniform diameter along its longitudinal expanse and small.

As best seen in FIG. 9, reduced out-flow valve 34 is dimensioned to fit snugly within the bore 68 of inflation tube 6. However, one skilled in the art will understand valve 34 can be positioned at any location between the inflation valve and the cushion or can be a component of the inflation valve itself. As shown, inflation valve 8 with an associated stepped fitting 66 is inserted into the open end of the inflation tube and held securely in place. However, any method or apparatus for attaching an inflation valve to the tube is appropriate. Reduced out-flow valve 34 is orientated within bore 64 of the tube is such that large opening 46 is orientated toward inflation valve 8. When air is introduced through inflation valve 8 to inflate the cushion, for example by a pump, the force of the pump air urges plunger 48 axially within bore 39 to a first position or until shoulders 60 and 61 abut shoulder 40 as seen in FIG. 10. The air is pumped through air flow spaces 62 and 63 and through plunger bore 64 and enters the array of cells substantially unimpeded.

However, when the cushion is overinflated and the user opens valve 8 to bleed air from the cushion, the force of the air toward valve 8 forces plunger 48 to move axially in bore 39 to a second position, or until O-ring 58 seats in counter bore 43 to effectively block or impede air flow flowing out of the array of cells through the reduced out-flow valve except for flow through plunger bore 64. Although the O-ring/shoulder/counter bore arrangement works well for its intended purpose, any element that effectively stops axial movement of plunger 48 in bore 39 will suffice. Air flow out of the cushion is dampened, which helps the user control out-flow and prevent over deflation of the cushion. Hence, reduced out-flow valve 34 allows for more rapid inflation of the cushion in its first position and slower deflation of the cushion in its second position.

Although various aspects of the sensor have been described relative to a cushion, it should be understood that the term cushion is used for convenience and brevity. Sensor 1 can be used with any type or size of cushion or inflatable mattress, seating or bedding.

It will be appreciated that any configuration of sensor that functions to detect and indicate a change in immersion depth, internal pressure or bottoming out condition is intended to be encompassed by the scope of the disclosure. For example, the sensor could be powered by solar energy rather than a battery or could include a rechargeable power supply or could have other types of warning indicators, such as pop-ups that can be checked tactilely, and so forth.

The invention claimed is:

1. An inflatable cushion having, a sensor for attachment to the cushion disposed to detect optimal immersion depth of a user seated on the cushion at set up, the sensor comprising: an inquiry actuator; a remove air indicator; an add air indicator; a user immersion depth indicator; a pressure transducer for measuring internal air pressure of the cushion; and a microprocessor configured to take regular readings of the internal air pressure from the pressure transducer and automatically detect optimal immersion depth-ef for the seated user based upon a rate of change in air pressure in the cushion by continuously calculating a difference between a current average pressure and an immediately preceding average pressure wherein if the difference is below a reference value then the optimal immersion depth is detected as air is released from the cushion.

2. The sensor of claim 1 further comprising a set-up actuator.

3. A sensor for attachment to an inflatable air cell cushion comprising: an apparatus disposed to sense optimal immersion of for a seated user in the inflatable cushion at set up by sensing air pressure in the cushion, said sensor further comprising a microprocessor configured to automatically determine optimal immersion depth of for the seated user based upon a rate of change in the air pressure in the cushion by continuously calculating a difference between a current average pressure and an immediately preceding average pressure wherein if the difference is below a reference value then the optimal immersion depth is detected as air is released from the cushion, volume of the cushion, a user's weight; and a surface area of cushion occupied by a properly positioned user.

4. A sensor for attachment to an inflatable air cell cushion comprising an apparatus disposed to sense optimal immersion of for a seated user in the inflatable cushion at set up by sensing air pressure changes as air is released from the cushion by continuously calculating a difference between a current average pressure and an immediately preceding average pressure wherein if the difference is below a reference value then the optimal immersion depth is detected, said apparatus comprising a microprocessor configured to automatically determine an optimal internal cushion pressure thereby determining an optimal immersion depth of the seated user at set up.

5. A method of setting up the optimal immersion of for a user in an inflatable cushion having an immersion sensor operatively associated therewith, comprising the steps of: overinflating the cushion; positioning the user seated on the cushion; actuating an inquiry actuator, whereby the sensor indicates the inflation status of the cushion; releasing air from the cushion if the inflation status indicates the cushion is overinflated; calculating automatically through an appropriately configured microprocessor associated with the sensor when the user is optimally immersed in the cushion at set up by continuously calculating a difference between a current average pressure and an immediately preceding average pressure wherein if the difference is below a reference value then the optimal immersion depth is detected; and indicating through the sensor that the user is optimally immersed in the cushion and thereby indicating to stop of the release of air from the cushion.

6. The method of claim 5 further comprising the step of actuating a set-up actuator to set proper immersion for the user after the step of actuating an inquiry actuator.

7. The method of claim 5 wherein the step of releasing air from the cushion when the cushion is overinflated further comprising releasing air through a reduced out-flow valve.

8. An inflatable air cell cushion and immersion sensor combination, comprising: an inflatable air cell cushion having a base and an array of inflatable air cells across the base; an airflow conduit in fluid communication with the array of inflatable air cells; an immersion sensor in fluid communication with the array of inflatable air cells, the sensor comprising a pressure transducer for measuring internal air pressure of the cushion and a microprocessor configured to take regular readings of the internal air pressure from the pressure transducer and automatically detect optimal immersion depth for a seated user at set up based upon a rate of change in air pressure in the cushion by continuously calculating a difference between a current average pressure and an immediately preceding average pressure wherein if the difference is below a reference value then the optimal immersion depth is detected as air is released from the cushion; and a reduced out-flow valve in the airflow conduit to control release of air from the array of cells.

9. The inflatable air cell cushion and immersion sensor combination of claim 8 wherein the immersion sensor further comprises: a housing; a pressure transducer for measuring air pressure in the cushion; an inquiry actuator; a remove air indicator; an add air indicator; a user immersion depth indicator; and a microprocessor configured to automatically detect optimal immersion depth of the seated user at set up based upon a rate of change in air pressure in the cushion as air is released from the cushion.

10. The inflatable air cell cushion and immersion sensor combination of claim 8 wherein the reduced outflow valve further comprises a body dimensioned to seat within the airflow conduit, said body defining a longitudinal bore; and a plunger slidingly engaged in the longitudinal bore, wherein the plunger is moved to a first position by the fluid force of air introduced into the array of cells through the airflow conduit, said first position allowing substantially unimpeded flow of air through the airflow conduit into the array of cells, and wherein the plunger is moved to a second position by the fluid force of air released From the array of cells through the airflow conduit, said second position allowing an impeded flow of air through the airflow conduit out of the array of cells.

11. A method of setting up the optimal immersion of for a user in an inflatable cushion having an immersion sensor operatively associated therewith, comprising the steps of: overinflating the cushion; positioning the user seated on the cushion; actuating an inquiry actuator, whereby the sensor indicates the inflation status of the cushion; releasing air from the cushion through a slow release valve if the inflation status indicates the cushion is overinflated; calculating automatically through an appropriately configured microprocessor associated with the sensor when the user is optimally immersed in the cushion based upon a rate of change in air pressure by continuously calculating a difference between a current average pressure and an immediately preceding average pressure wherein if the difference is below a reference value then the optimal immersion depth is detected as air is released from the cushion; and indicating through the sensor that the user is optimally immersed in the cushion and thereby indicating to stop the release, of air from the cushion.

* * * * *